J. W. PARKER.
HIGH SPEED SPINDLE.
APPLICATION FILED MAY 5, 1920.
1,392,210.
Patented Sept. 27, 1921.
4 SHEETS—SHEET 1.
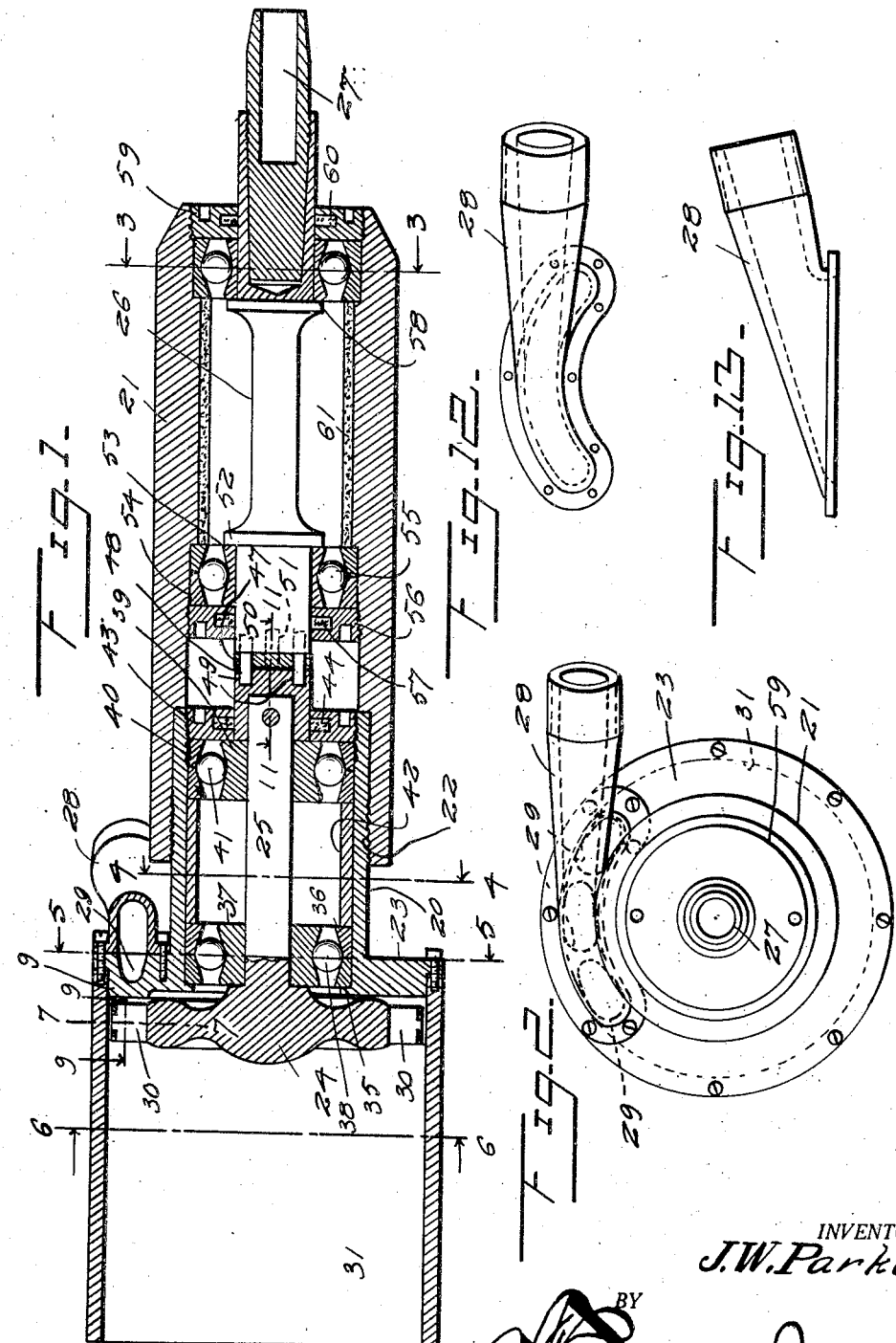
INVENTOR.
J. W. Parker
ATTORNEY.

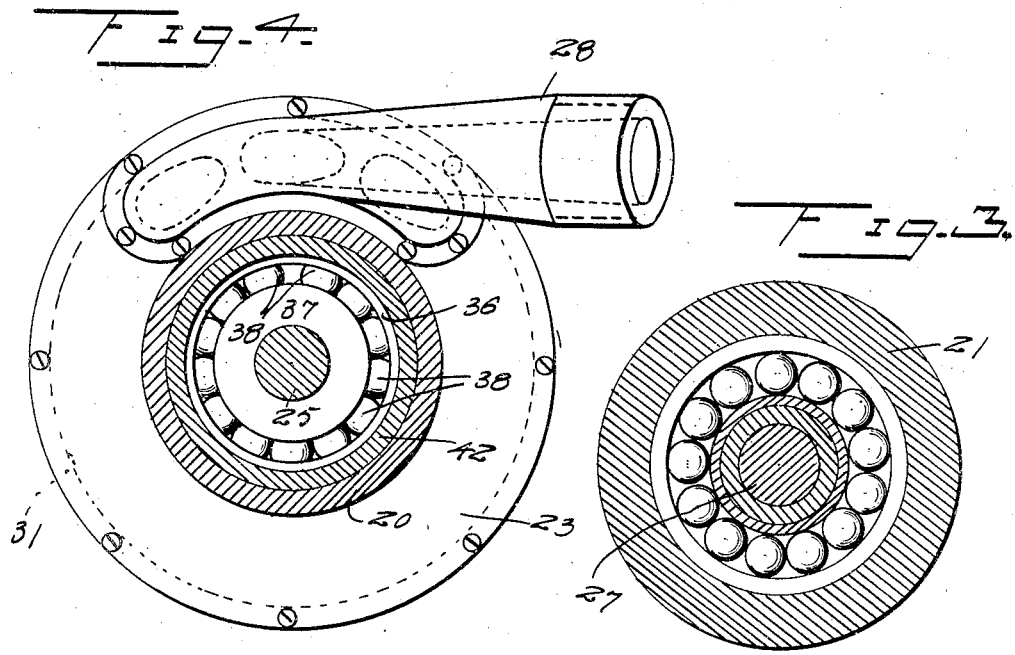

J. W. PARKER.
HIGH SPEED SPINDLE.
APPLICATION FILED MAY 5, 1920.
1,392,210.
Patented Sept. 27, 1921.
4 SHEETS—SHEET 3.
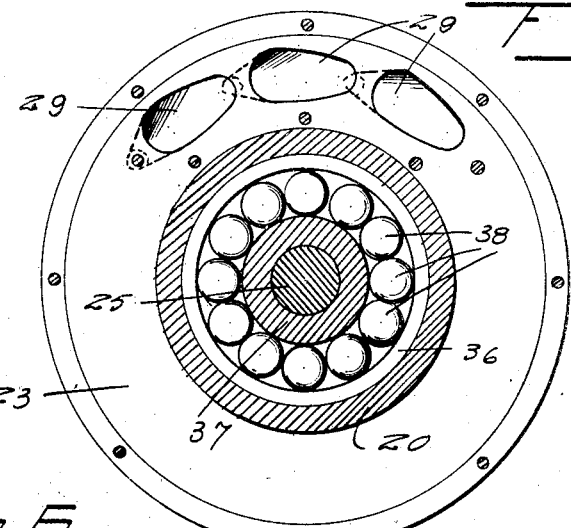
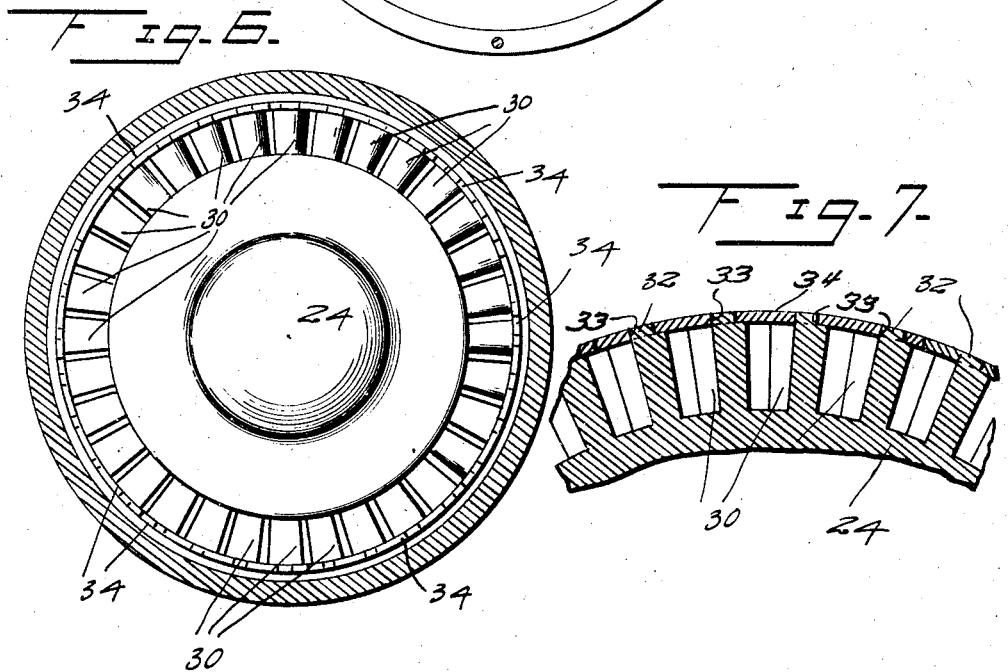
INVENTOR.
J. W. Parker
BY
ATTORNEY.

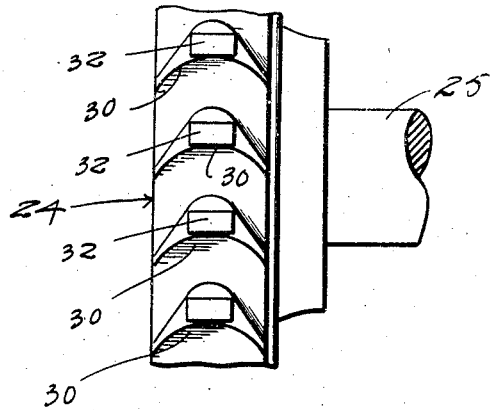
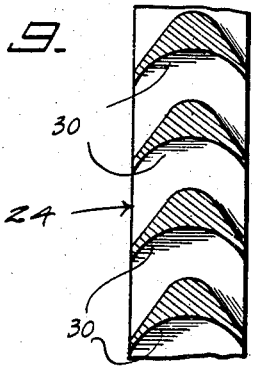
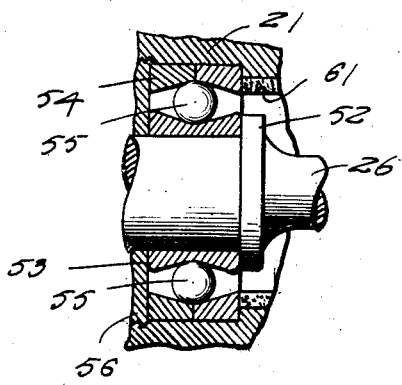
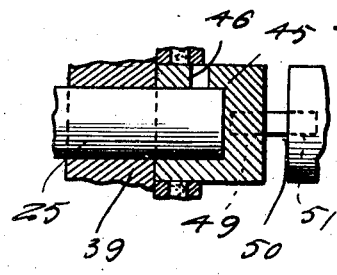

UNITED STATES PATENT OFFICE.

JOHN W. PARKER, OF DETROIT, MICHIGAN.

HIGH-SPEED SPINDLE.

1,392,210.  Specification of Letters Patent.  Patented Sept. 27, 1921.

Application filed May 5, 1920. Serial No. 379,118.

*To all whom it may concern:*

Be it known that I, JOHN W. PARKER, a subject of the King of Great Britain, residing at Detroit, in the county of Wayne and State of Michigan, have invented certain new and useful Improvements in a High-Speed Spindle; and I do hereby declare the following to be a full, clear, and exact description of the invention, such as will enable others skilled in the art to which it appertains to make and use the same.

The object of the invention is to provide a relatively simple and efficient construction and mounting of a spindle for high speed work, as for example up to one hundred thousand revolutions per minute, and designed while minimizing friction and thus overcoming the disadvantages of overheating and wearing, to permit of the assembling and disassembling of the elements with facility, to provide for eliminating longitudinal or axial vibration as well as lateral vibration, and to provide for the construction of the several parts or elements at a moderate cost, and more especially to increase the efficiency and durability of the ball bearings to avoid the necessity of repeatedly renewing or replacing the parts thereof; and with these objects in view the invention consists in a construction and combination of parts of which a preferred embodiment is shown in the accompanying drawings, wherein Figure 1 is a longitudinal sectional view of the spindle construction.

Fig. 2 is an end view of the same.

Figs. 3, 4, 5, 6 and 7 are transverse sectional views respectively on the planes indicated by the lines 3—3, 4—4, 5—5, 6—6 and 7—7 of Fig. 1.

Fig. 8 is an enlarged edge view of the propeller wheel.

Fig. 9 is a detailed sectional view through a portion of the blade or bucket carrying periphery of the wheel.

Fig. 10 is an enlarged sectional view taken longitudinally of one of the bearings on the plane of Fig. 1.

Fig. 11 is an enlarged longitudinal sectional view on the plane indicated by the line 11—11 of Fig. 1.

Figs. 12 and 13 are respectively plan and side views of the nozzle enlarged.

Fig. 14 is a side view of the spindle detached.

Fig. 15 is an enlarged detail view of portions of a set of the ball bearing cones to indicate the relative angles of the bearing surfaces thereof, the inner cone being shown in elevation and the outer cone in section.

The device consists essentially of a casing consisting of the tubular body 20 and the sleeve 21 disposed in telescoping relation and screw jointed together as at 22, said tubular body having a head 23, a propeller 24 consisting of a solid disk having a stem or drive shaft 25, a spindle 26 connected with the drive shaft and carrying a quill 27, and a nozzle 28 adapted to be connected with the source of air or other fluid pressure and attached to the head 23 for communication with a plurality of tapered jet passages 29 formed in the head for discharge of the fluid into the peripheral blades or buckets 30 of the propeller. Attached to and carried by the head of the body member of the casing is a tubular exhaust 31 in which the propeller is located and the blades or buckets of the latter are of arcuate form as indicated in detail in Figs. 8 and 9 with peripheral studs 32 for engagement with openings 33 formed in a housing band 34 embracing the periphery of the propeller and preferably formed in sections.

The bore of the body member of the casing is shouldered as indicated at 35 at the end adjacent to the plane of the propeller to form a seat for the outer cone member 36 of a ball bearing, said cone member being double beveled and disposed in facing relation with an inner cone member 37 with the interposed balls 38, said outer cone member also being double beveled but preferably consisting of separate rings as indicated, said construction providing for a four point bearing of each anti-friction ball, and one of the bevels of the inner cone member preferably being at a different angle from the other, so that in operation the balls receive a lateral rotary movement as well as a rotary movement parallel with the races. In practice it has been found desirable to make the angles of the outer ball cone or race respectively at 20° and 24°, so that in operation the balls receive one revolution laterally or sidewise to every three hundred sixty (approximately) revolutions in the direction parallel with the races. This insures a uniform wearing of the balls and hence a greater durability and longer life and utility thereof while serving, particularly owing to the four point bearing of the balls upon the races, to prevent endwise or axial as well as lateral play or lost motion between the parts. The drive shaft or stem 25 of the propeller also extends through a second bearing having a construction similar to that above described and consisting of the inner and outer cones or ball races 39 and 40 with interposed balls 41, the outer cones being spaced from those of the first named bearings by a spacing ring 42, and the members of the second bearing are secured in the tubular body member of the casing by a ring nut 43 which is hollow, having a cavity in which is fitted a felt or similar absorbent washer 44.

Upon the inner end of the drive shaft is fitted a drive collar 45, held in place by a transverse pin or screw 46, and interposed between said collar and the adjacent end of the spindle 26 is arranged a drive washer 47, having pins 48 fitted in sockets 49 in the drive collar and oppositely extending pins 50 extending into sockets in the end of the spindle as shown at 51. The adjacent end of the spindle, between the collar or enlargement 52 thereof and the drive washer is fitted in a ball bearing consisting of the inner and outer cones or races 53 and 54 with the interposed balls 55 constructed and arranged as described in reference to the ball bearings for the drive shaft, and held in place by a nut 56 threaded in the sleeve member of the casing and provided with an absorbent washer 57, while the outer end of said spindle beyond the collar or attachment 58 is mounted in a similar bearing corresponding in construction with those already described and held in place by a hollow nut 59 also provided with an absorbent washer 60. An oil retaining sleeve 61 of felt or like material is disposed in the bore of the sleeve member of the casing between the spaced bearings for the spindle. The quill is tapered at its inner end to snugly fit into and frictionally engage the correspondingly tapered socket in the end of the drive shaft.

Having thus described the invention, what is claimed is:—

1. A high speed spindle having a casing consisting of terminally telescoping tubular body and sleeve members, of which the former is provided with a head, an exhaust tube or cylinder carried by said head, a propeller having a drive shaft mounted in bearings in the body member of the casing and provided with peripheral blades or buckets, and a fluid presure nozzle attached to said head, the latter being provided with a plurality of tapered jet passages for directing the fluid pressure upon the blades or buckets of the propeller.

2. A high speed spindle having a casing, an exhaust tube or cylinder, a propeller having a drive shaft mounted in bearings in the casing, said propeller being provided with peripheral blades or buckets, peripheral studs upon the blades or buckets and a peripheral band provided with openings for the reception of said studs, the casing having jet passages for directing fluid pressure upon said blades or buckets.

3. A high speed spindle having a casing consisting of tubular body and sleeve members secured together in telescoping relation at their adjacent extremities, a propeller having a drive shaft or stem extending into the tubular body member of the casing, ball bearings having inner and outer double cone members and interposed balls for supporting said drive shaft or stem, and a spindle coupled to the end of the drive shaft or stem and mounted in the sleeve member of the casing.

4. A high speed spindle having a casing, a propeller provided with a stem or drive shaft disposed axially in the casing, spaced ball bearings for supporting said spindle and each consisting of inner and outer double cone ball races and interposed balls, the bearing surfaces of one of said cones being at different angles, and means for applying fluid pressure to the propeller.

5. A high speed spindle having a casing, a propeller provided with a drive shaft or stem, spaced ball bearings for said shaft or stem and each consisting of inner and outer double cone ball races and interposed balls, the outer ball race consisting of separate rings, a spacing ring interposed between said ball bearings, and a ring nut threaded in the casing in contact with the outer bearing and provided with a cavity fitted with an absorbent washer.

6. A high speed spindle having a casing, a propeller having a drive shaft or stem, a spindle arranged in alinement with said drive shaft or stem, anti-friction bearings for said drive shaft and spindle, a drive collar secured to the end of the drive shaft or stem, and a drive washer interposed between the drive shaft and the adjacent end of the spindle and having oppositely extending pins for engagement respectively therewith.

7. A high speed spindle having a casing comprising a tubular body member and a sleeve member disposed at their adjacent ends in telescoping relation, the body member having a terminal head carrying an exhaust tube or cylinder, a propeller having a drive shaft or stem extending axially into the body member of the casing and the head of the latter being provided with jet passages for discharging a motive fluid to the blades or buckets of the propeller, spaced bearings arranged in the body member of the casing and each consisting of inner and outer double coned ball races and interposed balls, a spacing ring interposed between said ball bearings, a ring washer threaded into the end of the body member of the casing for holding said bearings and spacing rings in operative relation, a spindle arranged axially in the sleeve member of the casing, spaced ball bearings for supporting said spindle and each consisting of inner and outer double cone ball races and interposed balls, an absorbent oil retaining spacer interposed between said bearings, ring nuts threaded in the sleeve member of the casing in contact with the remote sides of said bearings, a drive collar secured to the inner end of the drive shaft or stem, and a drive washer interposed between said drive collar and the adjacent end of the spindle and provided with oppositely extending pins for engagement with sockets respectively in said drive collar and spindle.

8. A high speed spindle having a casing, an exhaust tube or cylinder, a propeller in said cylinder and having a drive shaft mounted in bearings in the casing, said propeller being provided with peripheral blades or buckets, and the head of the casing having jet passages for directing fluid pressure upon said blades or buckets whereby the bearings for said propeller may be disposed wholly in the casing and the propeller in the exhaust cylinder.

In testimony whereof I affix my signature in presence of two witnesses.

JOHN W. PARKER.

Witnesses:
 IRA W. BRENEMAN,
 IVA R. SNOW.